F. VITALI.
TIRE SLEEVE.
APPLICATION FILED MAY 8, 1914.
1,114,556.
Patented Oct. 20, 1914.
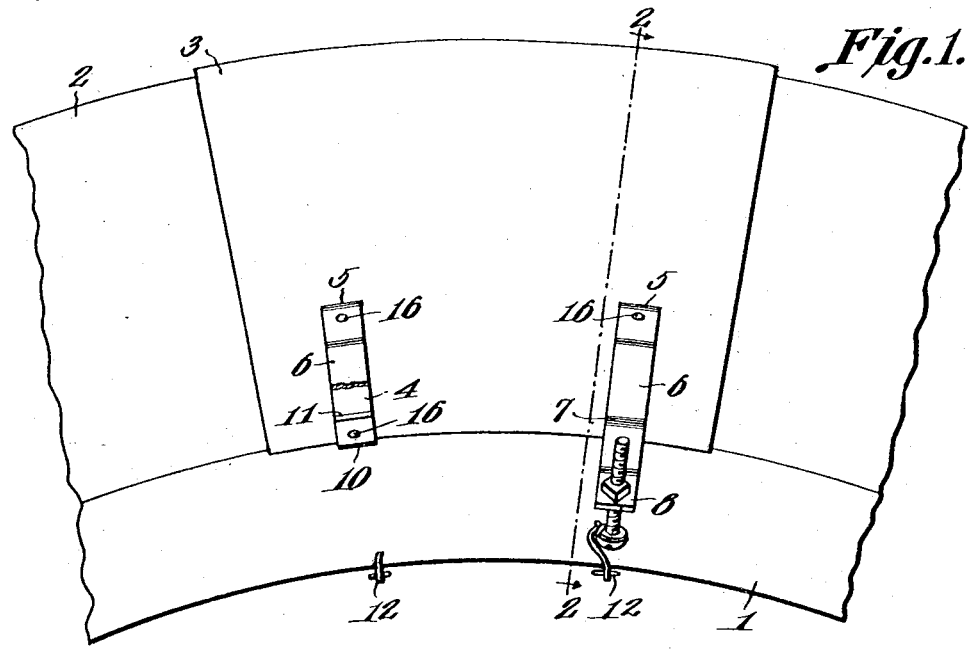
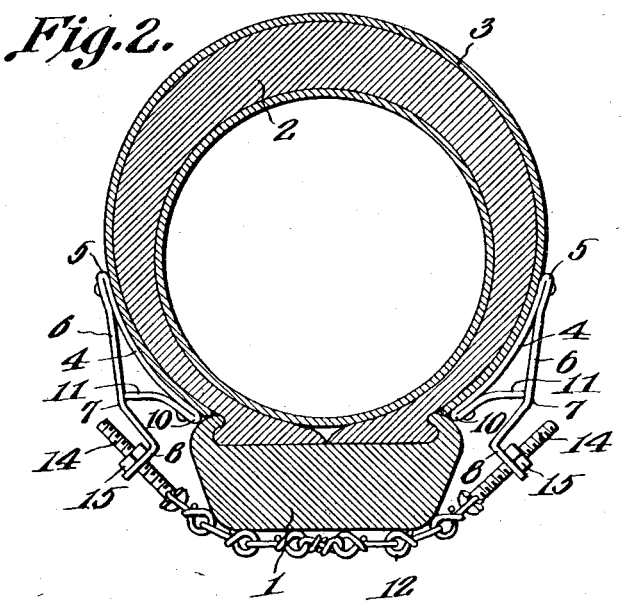
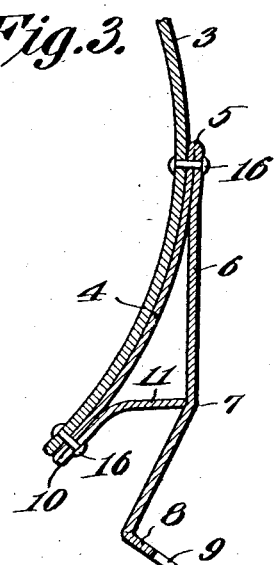
Witnesses
Frank Vitali, Inventor
by C. A. Snow & Co.
Attorneys

UNITED STATES PATENT OFFICE.

FRANK VITALI, OF HEALDSBURG, CALIFORNIA.

TIRE-SLEEVE.

1,114,556.   Specification of Letters Patent.   Patented Oct. 20, 1914.

Application filed May 8, 1914.   Serial No. 837,249.

*To all whom it may concern:*

Be it known that I, FRANK VITALI, a citizen of the United States, residing at Healdsburg, in the county of Sonoma and State of California, have invented a new and useful Tire-Sleeve, of which the following is a specification.

The device forming the subject matter of this application is a tire sleeve, and is adapted to be applied to a tire for the purpose of sealing a blowout, puncture, or other opening.

The invention aims to provide novel means for assembling the connecting chain with the jacket, and, in particular, aims to improve the strip whereby the connecting chain is united with the jacket.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawing: Figure 1 shows in side elevation, a portion of a tire to which the structure forming the subject matter of this application has been applied; Fig. 2 is a cross section on the line 2—2 of Fig. 1; Fig. 3 is a fragmental cross section depicting the connecting strip in detail.

In the drawings there is shown a felly 1 supporting a tire 2, these elements constituting no part of the present invention and being of any desired construction.

In case the tire 2 should be punctured, there is called into requisition, a jacket 3 which surrounds a portion of the tire 2 and serves to seal any opening formed therein. The jacket 3 may be made of rubber, canvas, or any other suitable material which will seal hermetically an opening in the tire 2. Strips 4 are applied to opposite sides of the jacket 3. Each strip 4 is folded along its upper edge as shown at 5, to form a suspension member 6 in which there is an angle 7, the suspension member 6 terminating in a lateral attaching element 8 having an opening 9. The strip 4 is folded as indicated at 10 to form a curved strut 11 engaged in the angle 7. This strut 11 may be more or less resilient.

The structure above described is applied in duplicate to opposed portions of the jacket 3. A tension means is shown, the same preferably comprising a chain 12 which extends across the felly 1. The ends of the chain 12 are held upon headed bolts 14, the same passing through the openings 9 in the attaching elements 8. Nuts 15 are threaded onto the bolts 14 and bear against the attaching elements 8. As will be understood readily, the jacket 3 may be drawn down firmly onto the tire 2 by rotating the nuts 15. The struts 11 exercise two functions. First, they serve to space the attaching elements 8 apart from the side faces of the felly 1, so that the nuts 15 may be rotated readily. Secondly, since the struts 11 may be resilient (although this feature is optional) the struts 11 serve to aid in tightening up the chain 12. Further, the struts 11, bearing at their ends against the suspension members 6, serve as a means whereby the inner edges of the jacket 3 are forced toward the median plane of the tire 2, thus affording a perfect and complete closure. In uniting the strips 4 with the jacket 3, rivets 16 or other connecting means are employed. These rivets 16 or their equivalents have two functions. First they serve to hold the strip 4 and its associated parts on the jacket; and secondly, they serve to maintain compressed, the bends indicated at 10 and 5. The strip 4, the suspension member 6 and the strut 11 need not be formed in one piece, it being desirable, merely, that the structure include a strut 11 of some sort, projecting laterally, and adapted to engage the suspension member 6 intermediate its ends.

Broadly considered, the device comprises a jacket 3, a connection 6—15—14—12—14—15—6 uniting opposed portions of the jacket 3, and a strut 11 projecting from the jacket 3 and engaging the connection, to wit the part 6 thereof.

Having thus described the invention, what is claimed is:—

1. In a device of the class described, a jacket; a connection uniting opposed portions of the jacket; and a strut projecting from the jacket and engaging the connection intermediate the ends of the connection, the connection being provided with an angle in which the strut is received.

2. In a device of the class described, a jacket; a connection uniting opposed portions of the jacket; and a resilient strut projecting from the jacket and engaging the connection intermediate the ends of the connection, the connection having an angle in which the strut is received.

3. In a device of the class described, a jacket; strips applied to the jacket, each strip being folded upon itself to form a suspension member, there being a strut projecting from the strip and engaging the suspension member; and connecting means assembled with the suspension members.

4. In a device of the class described, a jacket; strips applied to the jacket, each strip being folded upon itself to form an outstanding strut, there being a suspension member projecting from the strip and engaged by the strut; and connecting means assembled with the suspension members.

5. In a device of the class described, a jacket; strips applied to the jacket, each strip being folded upon its outer edge to form a suspension member and being folded upon its inner edge to form an outstanding strut engaging the suspension member; and connecting means assembled with the suspension members.

6. In a device of the class described, a jacket; a strip applied to the jacket and folded along its outer edge to form a suspension member, the suspension member being provided with an angle and having a laterally projecting attaching element, the inner edge of the strip being folded upon itself to form an outstanding strut which is engaged in the angle; and connecting means assembled with the attaching elements.

In testimony that I claim the foregoing as my own, I have hereto affixed my signature in the presence of two witnesses.

FRANK VITALI.

Witnesses:
 FRED. W. McCONNELL,
 ADLAI V. HASSETT.

Copies of this patent may be obtained for five cents each, by addressing the "Commissioner of Patents. Washington, D. C."